United States Patent
Yu et al.

(10) Patent No.: US 10,327,209 B2
(45) Date of Patent: Jun. 18, 2019

(54) BASEBAND PROCESSOR AND METHOD FOR POWER SAVING BY ADJUSTMENT OF CLOCK RATE AND SUPPLY VOLTAGE

(71) Applicant: Intel IP Corporation, Santa Clara, CA (US)

(72) Inventors: Zhibin Yu, Unterhaching (DE); Rajarajan Balraj, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/608,576

(22) Filed: May 30, 2017

(65) Prior Publication Data

US 2018/0007631 A1  Jan. 4, 2018

(30) Foreign Application Priority Data

Jun. 30, 2016 (EP) ..................................... 16177061

(51) Int. Cl.

| | |
|---|---|
| *H04B 1/00* | (2006.01) |
| *H04L 5/06* | (2006.01) |
| *H04M 3/16* | (2006.01) |
| *H04M 3/22* | (2006.01) |
| *G06F 1/324* | (2019.01) |
| *H04B 1/719* | (2011.01) |
| *H04L 27/06* | (2006.01) |
| *H04W 52/02* | (2009.01) |

(Continued)

(52) U.S. Cl.
CPC ........ *H04W 52/0251* (2013.01); *H04B 1/001* (2013.01); *H04B 1/719* (2013.01); *H04L 5/06* (2013.01); *H04L 27/06* (2013.01); *H04M 3/16* (2013.01); *H04M 3/2263* (2013.01); *H04W 52/0232* (2013.01); *H04W 52/48* (2013.01); *G06F 1/324* (2013.01); *G06F 1/3296* (2013.01); *Y02D 70/00* (2018.01); *Y02D 70/1262* (2018.01); *Y02D 70/1264* (2018.01)

(58) Field of Classification Search
CPC . Y02D 70/00; G06F 1/3203; H04W 52/0287; H04W 52/029
See application file for complete search history.

(56) References Cited

U.S. PATENT DOCUMENTS

| | | | |
|---|---|---|---|
| 2008/0205318 A1* | 8/2008 | Gupta | .................. H04B 1/1615 370/311 |
| 2010/0069128 A1* | 3/2010 | Cheng | .................. G06F 1/3203 455/574 |

(Continued)

OTHER PUBLICATIONS

Extended European Search Report dated Dec. 1 ,2016, on application No. 16177061.5.

*Primary Examiner* — Ross Varndell
(74) *Attorney, Agent, or Firm* — Lowenstein Sandler LLP (57) ABSTRACT

The disclosure relates to a baseband processing method, comprising: receiving a downlink (DL) baseband (BB) signal in a transmission time interval (TTI), wherein the DL BB signal comprises a time-frequency resource comprising a control section and a data section; decoding at least part of the control section to detect a DL grant information; if the DL grant information is detected, determine a number of granted data resource blocks from the DL grant information; and adjust at least one of a clock rate and supply voltage of the baseband processing based on the number of granted resource blocks.

25 Claims, 7 Drawing Sheets

(51) Int. Cl.
*H04W 52/48* (2009.01)
*G06F 1/3296* (2019.01)

(56) References Cited

U.S. PATENT DOCUMENTS

| | | | |
|---|---|---|---|
| 2014/0301262 A1* | 10/2014 | Homchaudhuri | H04W 52/0235 370/311 |
| 2015/0092893 A1* | 4/2015 | Tabet | H04L 27/2649 375/340 |
| 2016/0037550 A1* | 2/2016 | Barabell | H04B 17/318 455/450 |
| 2017/0164311 A1* | 6/2017 | Lee | H04L 5/005 |

* cited by examiner

BASEBAND PROCESSOR AND METHOD FOR POWER SAVING BY ADJUSTMENT OF CLOCK RATE AND SUPPLY VOLTAGE

RELATED APPLICATIONS

This application claims the benefit of European Patent Application No. EP16177061.5, filed on Jun. 30, 2016, the entire contents of which is hereby incorporated by reference in its entirety.

FIELD

The disclosure relates to a baseband processor and a baseband processing method for power saving by adjusting a clock rate and/or a supply voltage of the baseband processing in a mobile device. In particular, the disclosure relates to a method of dynamic power reduction in mobile devices according to a mobile standard such as LTE (Long Term Evolution).

BACKGROUND

Power saving is one of the most critical topic for cellular modem design. Low power design leads to longer battery life for a mobile device, which is extremely important for good user experience. The power consumption of a cellular modem in a mobile device 100 as exemplarily shown in FIG. 1 usually consists of two major contributors which are RF (radio frequency 101) power consumption 106 and BB (Baseband 103) power consumption 102 from the battery 105. The baseband power is further divided into dynamical power and leakage power. The dynamical power is usually much higher than the leakage power, and is proportionally with $V_{dd}^2 \ast f_{clk}$ where $V_{dd}$ is the baseband power supply voltage 102 and $f_{clk}$ is the baseband clock frequency 104. $f_{clk}$ and $V_{dd}$ are correlated such that a high $f_{clk}$ usually requires high $V_{dd}$ to satisfy the timing requirements in the silicon, for example setup-time and hold-time. In most LTE master scenarios, the baseband clocks with the highest rate are the system clock (sysClk) and control clock (ctrlClk) of the demodulation chain, i.e. inner receiver (IRX) and outer receiver (ORX), their clock settings determine $V_{dd}$ setting in most scenarios. There is a need to improve power efficiency in the mobile device.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
RF: Radio Frequency
BB: Baseband
PA: Power Amplifier
UL: Uplink
DL: Downlink
RX: Receiver
TX: Transmitter
IRX: Inner Receiver
ORX: Outer Receiver
TTI: Transmission Time Interval
RB: Resource Block, a block of time-frequency resources
DVFS: Dynamic Voltage and Frequency Scaling
CA: Carrier Aggregation
LTE: Long Term Evolution
UE: User Equipment, mobile device, mobile terminal
OFDM: Orthogonal Frequency Division Multiplex eNB,
eNodeB: Base station
MIMO: Multiple Input Multiple Output
PDCCH: Physical Downlink Control Channel
PDSCH: Physical Downlink Shared Channel
PBCH: Physical Broadcast Channel
IQ: In-phase/Quadrature
L1: layer 1, physical layer The methods and devices described herein may be based on baseband processing methods and baseband processors for use in mobile devices and radio receivers, in particular LTE radio receivers. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM.

The methods and devices described below may be implemented in mobile devices (or mobile stations or User Equipments (UE)), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes.

The methods and devices described hereinafter may be applied in eICIC systems. ICIC based on Carrier Aggregation may enable an LTE-A UE to connect to several carriers simultaneously. It not only may allow resource allocation across carriers, it also may allow scheduler based fast switching between carriers without time consuming handover.

The methods and devices described hereinafter may be applied in MIMO systems and diversity receivers. Multiple-input multiple-output (MIMO) wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency band. A diversity receiver uses two or more antennas to improve the quality and reliability of a wireless link.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

Figure 2:
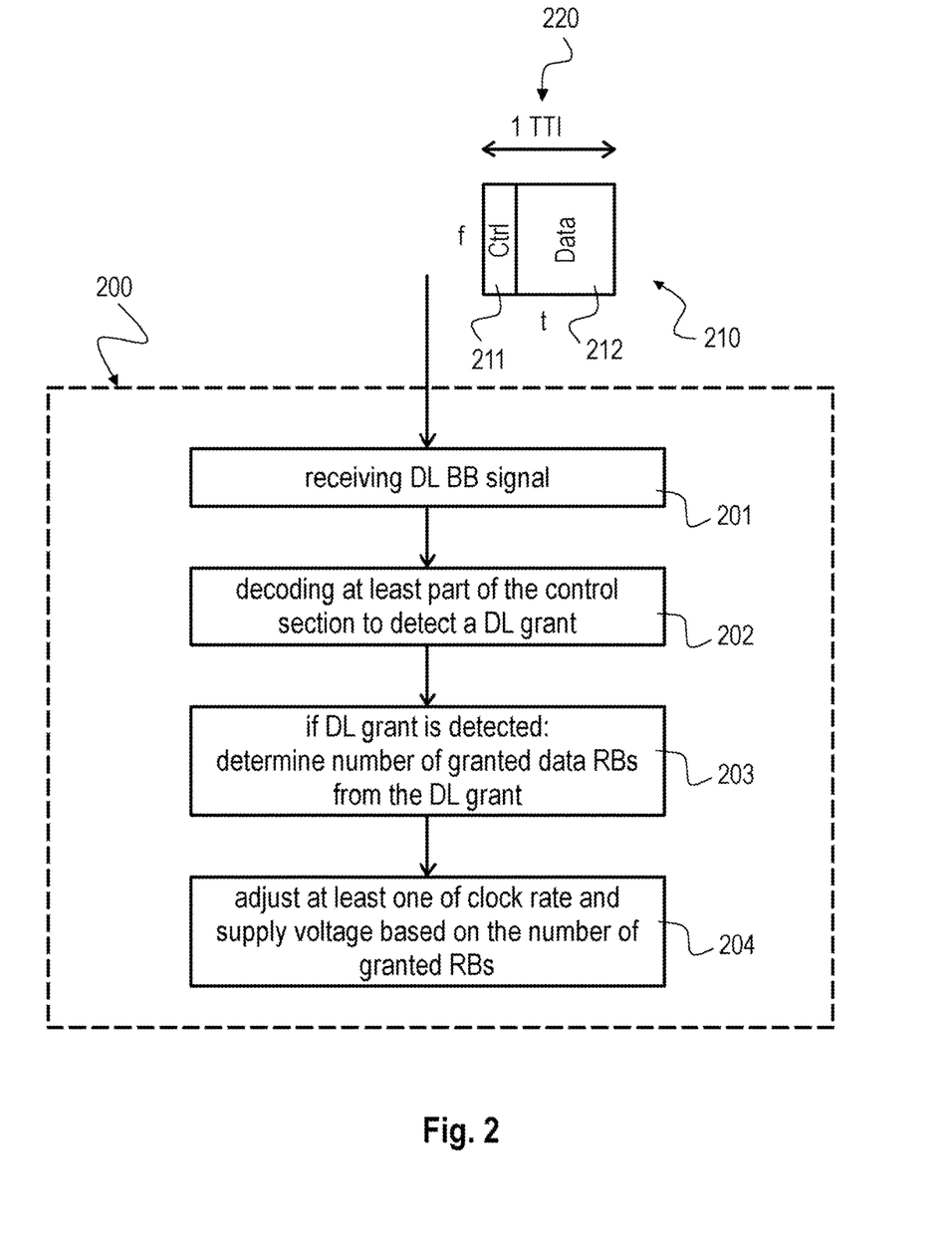
FIG. 2 schematically illustrates an exemplary method 200 for baseband processing according to the disclosure.

FIG. 2 schematically illustrates an exemplary baseband processing method 200 according to the disclosure. The method 200 includes receiving 201 a downlink (DL) baseband (BB) signal in a transmission time interval (TTI) 220, wherein the DL BB signal comprises a time-frequency resource 210 comprising a control section 211 and a data section 212, e.g. as described below with respect to the baseband signal 300 in FIG. 3. The method 200 includes decoding 202 at least part of the control section 211 to detect a DL grant information. The method 200 further includes: If the DL grant information is detected, determine 203 a number of granted data resource blocks from the DL grant information, e.g. granted resource blocks 301 as described below with respect to FIG. 3. The method 200 includes adjust 204 at least one of a clock rate and supply voltage, e.g. DC supply voltage of the baseband processing based on the number of granted resource blocks. This means there are the following three possible adjusting cases: Only adjusting the clock rate, only adjusting the supply voltage and adjusting both, clock rate and supply voltage. Usually, clock rate and supply voltage are correlated such that a high clock rate fclk requires a high supply voltage and vice versa. The dynamical power may be proportional to $Vdd^2*fclk$ where Vdd is the supply voltage and fclk is the clock rate.

The method 200 may include decoding the at least part of the control section in an initial part of the TTI, i.e. an early part of the TTI which is first in time. The initial part of the TTI may include a first, second or third OFDM symbol of the DL BB signal, i.e. the first symbols of the TTI which arrive first in time. The method 200 may include reducing the at least one of the clock rate and supply voltage of the baseband processing if the number of granted data resource blocks is smaller than a pre-defined threshold. Reducing the at least one of the clock rate and supply voltage of the baseband processing may include a step-wise reduction based on a set of predefined clock rates.

Adjusting the at least one of the clock rate and supply voltage may include: obtaining a clock and voltage setting for the baseband processing from a lookup table; and applying the obtained clock and voltage setting to the baseband processing. The lookup table may store pre-defined clock and voltage settings based on pre-defined numbers of granted data resource blocks. A pre-defined clock and voltage setting for a pre-defined number of granted data resource blocks may include a setting configured to guarantee to meet real-time processing of the number of granted data resource blocks within the TTI, i.e. no data is lost due to the clock and voltage setting. The pre-defined clock and voltage setting may include a setting configured to guarantee the real-time processing for a minimum clock and supply voltage, i.e. this setting for clock rate and voltage specifies the lowest acceptable values for clock rate and voltage for which no data is lost.

The method 200 may further include storing a current clock and voltage setting before applying the obtained clock and voltage setting to the baseband processing. The method 200 may further include adjusting the at least one of the clock rate and supply voltage of the baseband processing based on dynamical voltage and frequency scaling (DVFS).

The method 200 may further include demodulating and decoding the granted data resource blocks as indicated by the DL grant information within a first section of the TTI. The method 200 may further include turning off the demodulating and decoding for the remaining section of the TTI after having demodulated and decoded the granted data resource blocks.

The DL grant information may be detected from a PDCCH channel of the DL BB signal and the number of granted data resource blocks may indicate granted resource blocks in a PDSCH channel of the DL BB signal, e.g. as described below with respect to FIG. 3.

Figure 3:
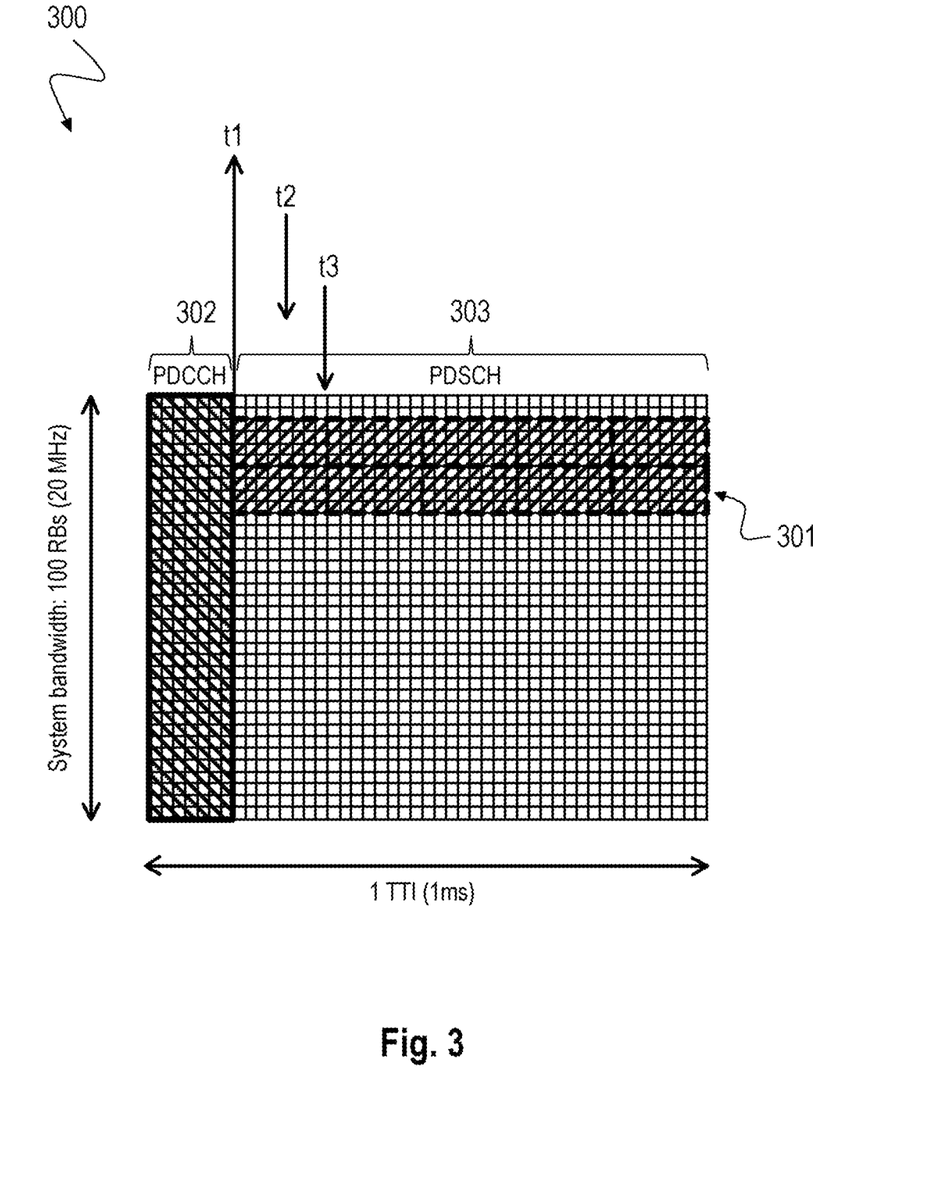
FIG. 3 schematically illustrates an exemplary downlink baseband signal 300 as received by the method 200 of FIG. 2.

FIG. 3 schematically illustrates an exemplary downlink baseband signal 300 as received by the method 200 of FIG. 2 to illustrate the concept according to the disclosure. In the example of FIG. 3 the DL BB signal 300 is according to the LTE standard including a time frequency resource. The time frequency resource has time duration of 1 TTI which may correspond to one millisecond, for example and system bandwidth of 100 resource blocks (RBs) which may correspond to 20 MHz, for example. Different time frequency configurations are applicable, for example N100 (100 RBs according to channel bandwidth of 20 MHz), N75 (75 RBs according to channel bandwidth of 15 MHz), N50 (50 RBs according to channel bandwidth of 10 MHz), N25 (25 RBs according to channel bandwidth of 5 MHz), N15 (15 RBs according to channel bandwidth of 3 MHz) and N6 (6 RBs according to channel bandwidth of 1.4 MHz). The time frequency resource of the DL BB signal 300 includes a first (initial or early) part 302 which is the physical downlink control channel (PDCCH) and a second (succeeding or later) part 303 which is the physical downlink shared channel (PDSCH). The PDCCH 302 may include DL grant information indicating granted PDSCH DL RBs 301.

As mentioned above, in most LTE master scenarios, the demodulation chain (inner receiver (IRX) and outer receiver (ORX), see FIG. 4 below) has the highest clock rates compared to other components within a modem, and therefore dominates the setting of the baseband voltage $V_{dd}$.

The disclosure identifies dynamic scenarios where the baseband clock rates of the demodulation chain can be dynamically reduced in order to reduce the baseband voltage $V_{dd}$. This results in baseband power reduction. The concept is to dynamically identify the possible scenarios based on the number of assigned RBs for LTE DL grant, and dynamically trigger the run-time DVFS based on the detected scenario to achieve dynamic power reduction.

The concept is that, in each LTE TTI, PDCCH processing is done in the early part of TTI do decode the DL grant information. If DL grant is received, then the number of granted PDSCH resource blocks (RB) in the current TTI is further checked: When the number of granted RBs is smaller than a pre-defined threshold, the baseband clock rate can be dynamically lowered down and thus also the baseband voltage for power saving; for example, to change $V_{high}$ down to $V_{mid}$ or even down to $V_{low}$ depending on the number of granted RBs. Run-time change of voltage and clock rate may be performed by Dynamical Voltage and Frequency Scaling (DVFS) technique. Then, based on the new settings, PDSCH processing for the remaining TTI can be performed. By doing this, the processing speed requirement can be still met because the major computation load in the LTE demodulation chain (IRX+ORX) is proportionally scaled with the actual number of granted RBs, not the overall serving cell system bandwidth. The clock settings based on serving cell system bandwidth is targeting at only the worst case of full granted resource allocation, which usually does not happen in the real field. So, even the serving cell system bandwidth is high, as long as the number of granted PDSCH RBs is small, the computation load requirement is low and the processing hardware can finish the PDSCH processing with much slower clocks and therefore lower voltage. Note that a small number of granted PDSCH RBs happens quite a lot in the real field because usually several users are sharing the same bandwidth.

When $f_{clk}$ and $V_{dd}$ are reduced, the baseband dynamic power consumption is significantly reduced because the dynamic power consumption is proportional scaled with $V_{dd}^2 * f_{clk}$. This concept is further illustrated by FIG. 3. For simplicity, other small channels, for example PBCH are skipped in FIG. 3 because they are irrelevant with this idea.

Please note that the concept according to the disclosure can be used in almost all LTE modes when PDSCH may be possibly needed to be demodulated, including RRC_IDLE mode, RRC_CONNECTED mode with single carrier, and RRC_CONNECTED mode with carrier aggregations. Especially in RRC_IDLE mode, the power saving gain is more significant. That is because TX is usually disabled in RRC_IDLE mode, then RF TX PA is switched off. Note that RF TX PA is one of the biggest power contributors in RF. Because of that, the baseband dynamic power occupies the biggest power contributions of the whole modem platform. Reducing baseband dynamic power based on this concept can significantly reduce the overall platform power consumption for RRC_IDLE.

Please also note that this method is not conflicting with any other power saving methods. This method can be applied together with other power saving methods, to cover different scenarios separately, and to achieve optimal power saving, without any throughput performance penalty. The disclosed method can still provide power reduction gain when the UE gets LTE DL grant and needs to process PDSCH, without performance loss or performance degradation.

Figure 4:
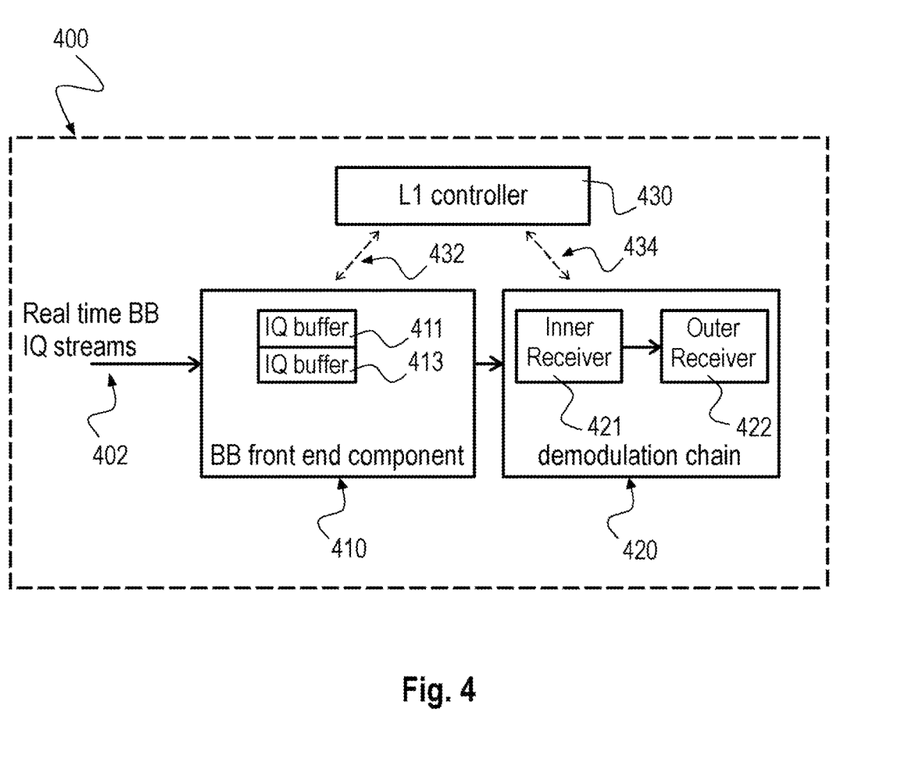
FIG. 4 schematically illustrates a high-level architecture of an exemplary baseband processor 400 according to the disclosure.

FIG. 4 schematically illustrates a high-level architecture of an exemplary baseband processor 400 according to the disclosure.

Figure 1:
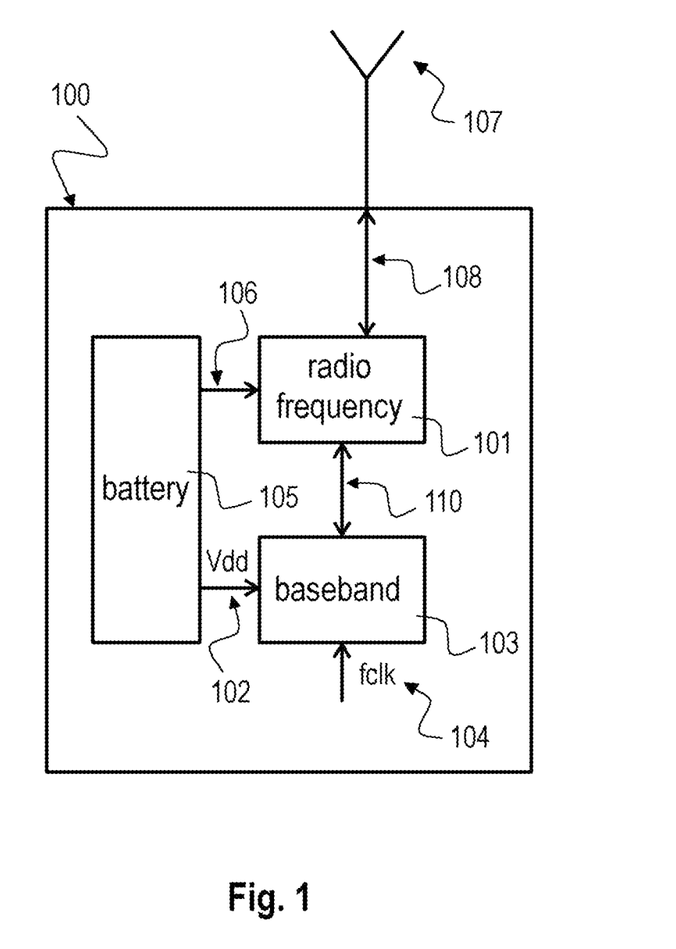
FIG. 1 is a schematic diagram illustrating a mobile device 100 having a radio frequency (RF) module 101 and a baseband (BB) processing module 103 which are supplied by a battery 105.

The baseband processor 400 is an implementation of the baseband processing module 103 described above with respect to FIG. 1. The baseband processor 400 includes a BB front end component 410, a demodulation chain 420 and a controller 430, e.g. a layer 1 (L1) controller. The BB front end component 410 receives a DL BB signal 402, e.g. real time BB IQ (In-phase/Quadrature) streams 110 from an RF module 101 as depicted in FIG. 1. The BB IQ streams are temporarily stored in two IQ buffers 411, 413, processed by the BB front end component 410 and transferred to the demodulation chain 420 which includes an inner receiver (IRX) 421 and an outer receiver (ORX) 422. The BB front end component 410 and the demodulation chain 420 are controlled by the L1 controller 430 via respective control signals 432, 434.

The baseband front end component 410 is configured to receive a downlink (DL) baseband (BB) signal 402 in a transmission time interval (TTI). The DL BB signal includes a time-frequency resource including a control section and a data section as described above with respect to FIGS. 2 and 3. The demodulation chain 420 is configured to decode at least part of the control section, e.g. the part of the control section which usually carries the DL grant information. If DL grant information is detected, only part of the control section may be decoded. If no DL grant information is detected, the whole control section may be decoded. The controller 430 is configured to detect a DL grant information from the decoded control section and if the DL grant information is detected: to determine a number of granted data resource blocks from the DL grant information and to adjust at least one of a clock rate and supply voltage, e.g. a DC supply voltage of the baseband processor based on the number of granted resource blocks, e.g. as described above for the method 200 in FIG. 2.

The demodulation chain 420 may decode the at least part of the control section in an initial (or early) part of the TTI. The initial part of the TTI may include a first, second or third OFDM symbol of the DL BB signal. The controller 430 may reduce the at least one of the clock rate and supply voltage of the baseband processor if the number of granted data resource blocks is smaller than a pre-defined threshold. The controller 430 may step-wise reduce the at least one of the clock rate and supply voltage of the baseband processor based on a set of predefined clock rates and supply voltages.

The baseband processor 400 may include a lookup table to store a clock and voltage setting for the baseband processor. The controller 430 may obtain the clock and voltage setting for the baseband processor from the lookup table and apply the retrieved clock and voltage setting to the baseband processor 400. The lookup table may store pre-defined clock and voltage settings based on pre-defined numbers of granted data resource blocks. A pre-defined clock and voltage setting for a pre-defined number of granted data resource blocks may include a setting that guarantees to meet real-time processing of the number of granted data resource blocks within the TTI. The pre-defined clock and voltage setting may include a setting that guarantees the real-time processing for a minimum clock and supply voltage.

The lookup table may store a mapping between number N of resource blocks and clock and voltage setting S. The clock and voltage setting may include a predefined clock rate and supply voltage that should be applied for the respective number of RBs. In a first exemplary configuration of the lookup table, between a first number N1 and a second number N2 of RBs a first setting S1 is applied and between the second number N2 and a third number N3 a second setting S2 is applied. In a second exemplary configuration of the lookup table, between a first number N1 and a second number N2 of RBs a first setting S1 is applied, between the second number N2 and a third number N3 a second setting S2 is applied and between the third number N3 and a fourth number N4 a third setting S3 is applied.

In a third exemplary configuration of the lookup table, the following mapping is applied: N1-N2→S1; N2-N3→S2; N3-N4→S3; N4-N5→S4. In a fourth exemplary configuration of the lookup table, the following mapping is applied: N1-N2→S1; N2-N3→S2; N3-N4→S3; N4-N5→S4; N5-N6→S5. Further such settings may be applied for different configurations of the lookup table. N1, N2, N3 etc. are numbers between 1 and a maximum number of configured resource blocks, e.g. 100. S1, S2, S3 etc. are different clock and voltage settings for these numbers of RBs. A maximum number of different settings may correspond to the maximum number of configured resource blocks, e.g. 100.

The baseband processor 400 may include a memory to store a current clock and voltage setting before applying the retrieved clock and voltage setting to the baseband processor. The controller 430 may adjust the at least one of the clock rate and supply voltage of the baseband processor 400 based on dynamical voltage and frequency scaling (DVFS).

The demodulation chain 420 is configured to demodulate and decode the granted data resource blocks as indicated by the DL grant information within a first section of the TTI. The controller 430 may turn off the demodulation chain for the remaining section of the TTI after having demodulated and decoded the granted data resource blocks.

The controller 430 may detect the DL grant information from a PDCCH channel of the DL BB signal. The number of granted data resource blocks may indicate granted resource blocks in a PDSCH channel of the DL BB signal.

The buffer 411, 413 may temporarily buffer the downlink (DL) baseband (BB) signal 402 during a setup time when the at least one of the clock rate and supply voltage of the baseband processor 400 is adjusted. The inner receiver 421 of the demodulation chain 420 demodulates the DL BB signal. The outer receiver 422 of the demodulation chain 420 decodes the demodulated DL BB signal. The demodulation chain 420 may be configured to process the DL BB signal 402 in a current TTI before a new DL BB signal is received at the baseband front end component 410 in a next TTI.

In FIG. 4, the real-time baseband IQ samples 402 from the RF engine stream through the baseband front end component 410, and are then further processed by the demodulation chain 420. The baseband front end component 410 does the AGC (analog gain control) controls and it takes care of IQ sample buffering 411, 413. The buffer 411, 413 ensures that IQ sample reception and baseband processing can be executed at the same time. The buffer 411, 413 also serves for temporally buffer the IQ samples 402 during the setup time when run-time voltage and clocking change is just applied.

The demodulation chain 420 includes the inner receiver 421 and the outer receiver 422. The inner receiver 421 does typical signal processing of OFDM symbols, such as parameter estimation, channel estimation, time and frequency interpolation, demodulation, soft bit generation, etc. The outer receiver 422 does channel decoding for different channels, for example PBCH, PDCCH and PDSCH.

It is very important to note that, there is hard real-time requirement that the demodulation chain 420 must be able to process one TTI LTE sample within one TTI time (1 ms), so as not to block the baseband front end 410 from further receiving IQ samples 402 from RF. Also note that the computation load for the demodulation chain 420 is proportionally scaled with the number of granted RBs to process. For example the number of operations of the channel equalizer and the de-mapper in IRX 421 is linearly scaled with granted RBs. That is why high clocks are needed to be able to meet the hard-real time requirement when the number of the granted RBs is high, and vice versa.

The L1 controller 430 interacts with front end component 410 and the demodulation chain 420 through control signals 432, 434 or messages. The L1 controller 430 may also control the baseband clock settings and voltage settings. The control procedure of applying this method as further described below with respect to FIG. 5 may be mainly implemented in L1 controller 430 which interacts and controls various physical layer subcomponents, and also controls the overall frequency and voltage settings.

The baseband processor 400 may be implemented in a mobile device or user equipment (UE) as described above with respect to FIG. 1. Such a UE 100 may include a radio frequency module 101 coupled to an antenna port 107 for transceiving radio signals 108. The UE 100 may further include the baseband processor 103, 400 for baseband processing of the radio signals 108 transceived by the radio frequency module. The baseband processor 103, 400 is coupled to the radio frequency module 101 by an interface 110. The baseband processor 103, 400 may be operated by a baseband clock frequency 104. The UE 100 may further include a battery 105 for supplying the baseband processor 103, 400 and the radio frequency module 101 with their adequate supply voltages 102, 106.

Figure 5:
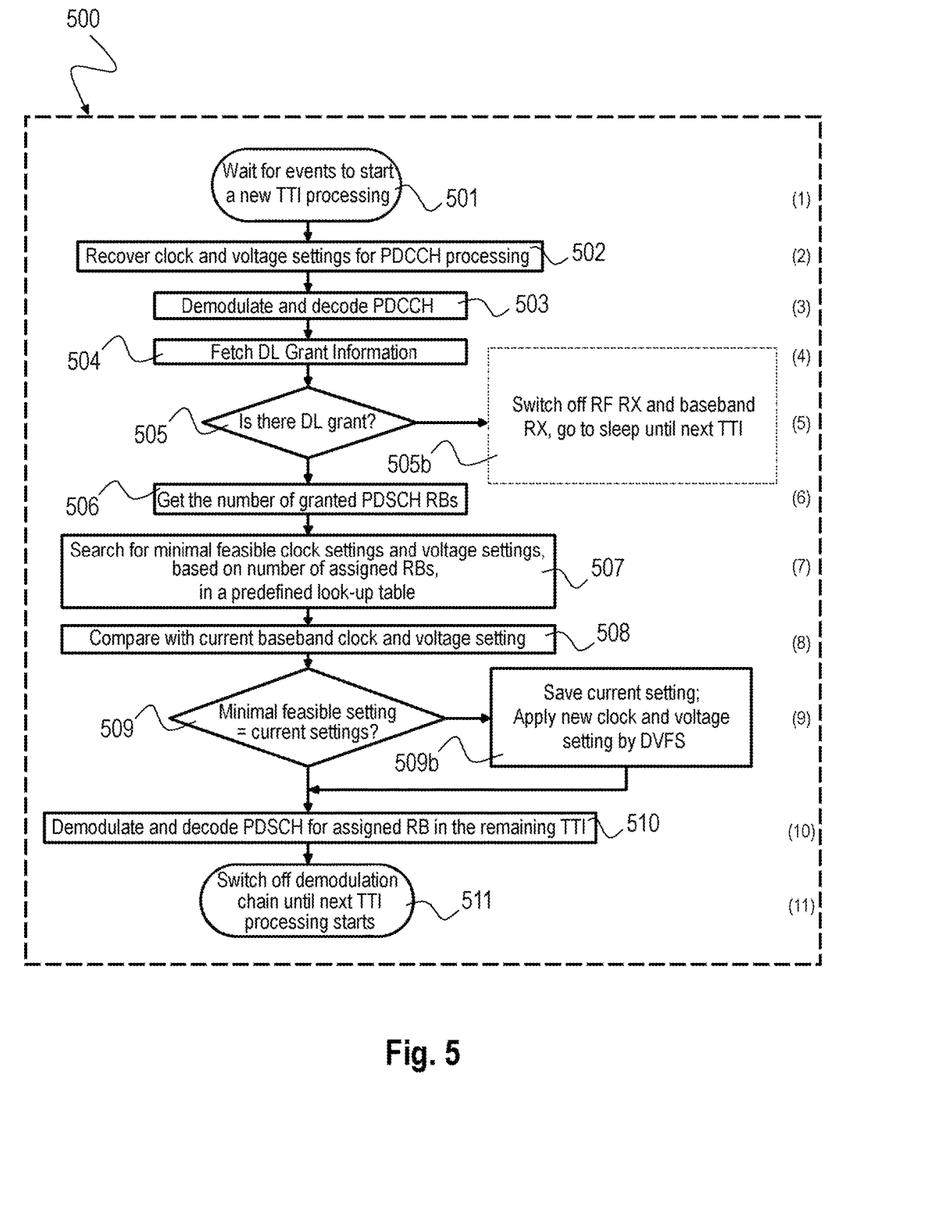
FIG. 5 schematically illustrates a schematic diagram of a method 500 of dynamic power reduction in an LTE mobile device according to the disclosure.

FIG. 5 schematically illustrates a schematic diagram of a method 500 of dynamic power reduction in an LTE mobile device according to the disclosure. The method 500 is an exemplary implementation of the method 200 described above with respect to FIG. 2 that can be implemented in a controller 430 as described above with respect to FIG. 4.

In block (1) 501, the procedure is triggered by a new LTE TTI processing for 1 ms of downlink data. In block (2) 502 the baseband voltage and clock frequency setting is recovered for PDCCH processing and decoding. In block (3) 503 PDCCH which is located in the early part (PDCCH is located usually the first 1 or 2 or 3 OFDM symbols of a TTI) of the current 1 ms TTI is decoded. In block (4) 504 the DL grant information is fetched. In block (5) 505 the procedure checks whether the serving cell gets DL grant for the current TTI or not, and if no, the procedure goes to block 505b where the RX path is switched off for the remaining TTI. If the serving cell gets the DL grant, the procedure goes to block (6) 506 and it further checks the number of granted DL RBs from decoded PDCCH. In block (7) 507, based on the granted DL RB number, the controller searches in a pre-defined look-up table to find the minimal baseband clock settings and voltage settings which can still meet the real-time requirement to process the granted RBs for the remaining TTI. In block (8) 508 it compares the derived minimal feasible clock rate settings and voltage settings from the look-up table, with the current clock rate settings and voltage settings which were used for PDCCH decoding. In block (9) 509, if the derived settings are not equal with current settings, the current settings are stored and will be later on recovered in the next TTI for next PDCCH processing, like in block (2) 502. And then in block (9b), DVFS technique is applied here, that is to run-time apply the new baseband clock settings and voltage settings. In block (10) 510 the baseband processes and decodes the PDSCH for the remaining TTI based on the new clock rates and the new $V_{dd}$. In block (11) 511 the procedure goes to IDLE and waits for the event to start the next TTI.

Figure 6:
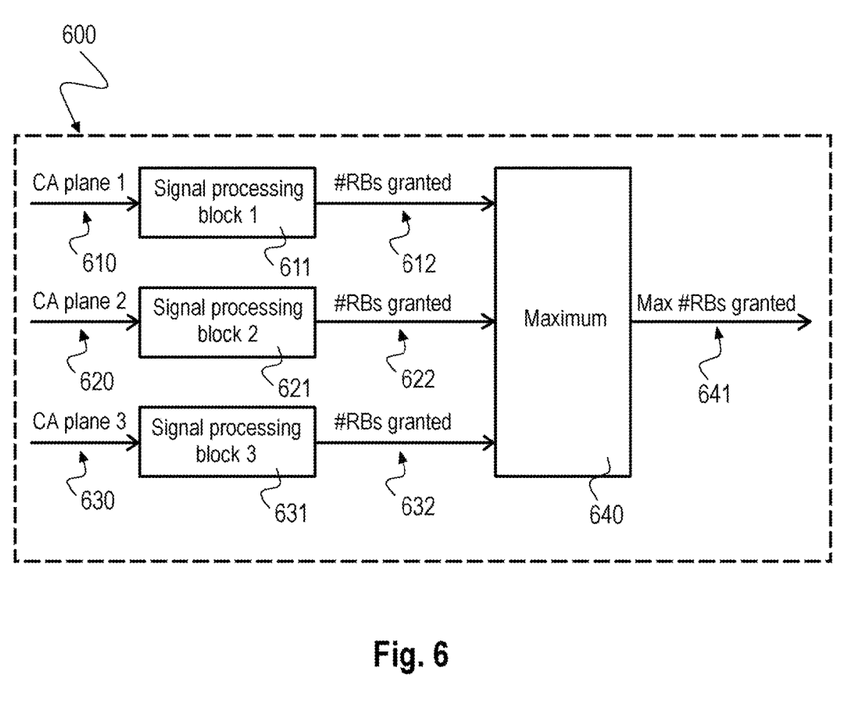
FIG. 6 illustrates an exemplary carrier aggregation (CA) device 600 where different CA planes use parallel and independent signal processing hardware blocks according to the disclosure.

FIG. 6 illustrates an exemplary carrier aggregation (CA) device 600 where different CA planes use parallel and independent signal processing hardware blocks according to the disclosure.

The concept as described in this disclosure can not only be used in LTE single carrier scenario but also in carrier aggregation (CA) scenario. For CA case the control procedure may be similar like that in FIG. 5. The major difference is that: in case different CA planes 610, 620, 630 use parallel and independent signal processing hardware blocks 611, 621, 631, then the minimal feasible clock and voltage setting may be determined by the CA plane which is granted with the maximal number of RBs. A maximum determination circuit 640 can be used to determine the maximum number of granted RBs 641 from the respective numbers of granted RBs 612, 622, 632 of the different CA planes.

Figure 7:
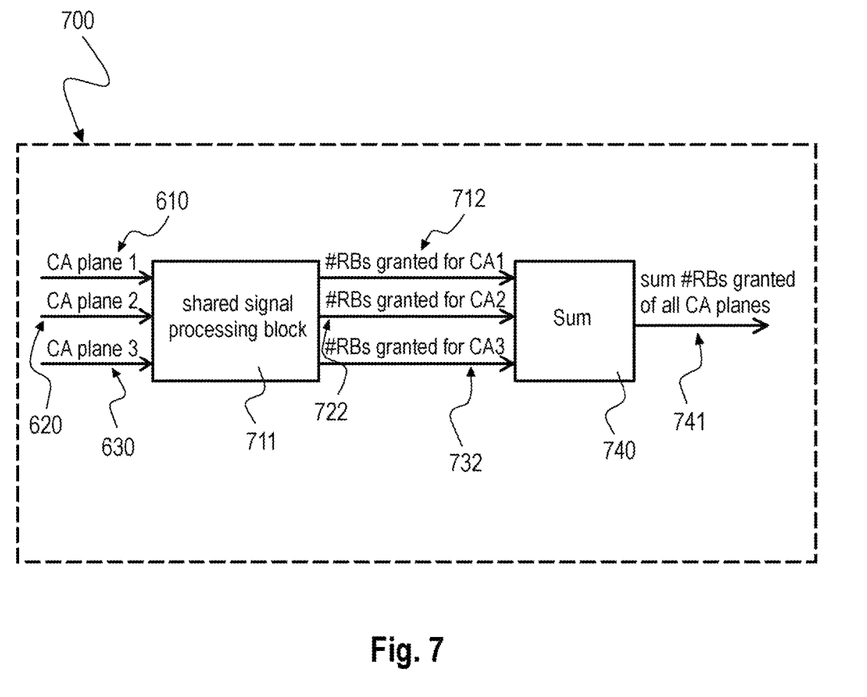
FIG. 7 illustrates an exemplary carrier aggregation device 700 where different CA planes use a shared signal processing hardware block according to the disclosure.

FIG. 7 illustrates an exemplary carrier aggregation device 700 where different CA planes use a shared signal processing hardware block according to the disclosure. In case different CA planes 610, 620, 630 use shared signal processing hardware 711 as depicted in FIG. 7, then the minimal feasible clock and voltage setting may be determined by the sum of granted RBs 712, 722, 732 of all CA planes 610, 620, 630. A summation circuit 740 can be used to determine this sum 741.

In case of a hybrid architecture having parallel HW blocks 611, 621, 631 as shown in FIG. 6 plus time shared HW blocks 711 as shown in FIG. 7, two intermediate minimal feasible clock setting values may be generated separately: one may be derived by parallel HWs based on maximal number of granted RBs, and another one may be derived by CA-shared HW based on the sum of all granted RBs, and the final clock and the final voltage setting may be selected as the bigger one between the two.

EXAMPLES

The following examples pertain to further embodiments. Example 1 is a baseband processing method, comprising: receiving a downlink (DL) baseband (BB) signal in a transmission time interval (TTI), wherein the DL BB signal comprises a time-frequency resource comprising a control section and a data section; decoding at least part of the control section to detect a DL grant information; if the DL grant information is detected, determine a number of granted data resource blocks from the DL grant information; and adjust at least one of a clock rate and supply voltage of the baseband processing based on the number of granted resource blocks.

In Example 2, the subject matter of Example 1 can optionally include decoding the at least part of the control section in an initial part of the TTI.

In Example 3, the subject matter of Example 2 can optionally include that the initial part of the TTI comprises one of a first, second or third OFDM symbol of the DL BB signal.

In Example 4, the subject matter of any one of Examples 1-3 can optionally include reducing the at least one of the clock rate and supply voltage of the baseband processing if the number of granted data resource blocks is smaller than a pre-defined threshold.

In Example 5, the subject matter of Example 4 can optionally include that reducing the at least one of the clock rate and supply voltage of the baseband processing comprises a step-wise reduction based on a set of predefined clock rates.

In Example 6, the subject matter of any one of Examples 1-5 can optionally include that adjusting the at least one of the clock rate and supply voltage comprises obtaining a clock and voltage setting for the baseband processing from a lookup table; and applying the obtained clock and voltage setting to the baseband processing.

In Example 7, the subject matter of Example 6 can optionally include that the lookup table stores pre-defined clock and voltage settings based on pre-defined numbers of granted data resource blocks.

In Example 8, the subject matter of Example 7 can optionally include that a pre-defined clock and voltage setting for a pre-defined number of granted data resource blocks comprises a setting configured to guarantee to meet real-time processing of the number of granted data resource blocks within the TTI.

In Example 9, the subject matter of Example 8 can optionally include that the pre-defined clock and voltage setting comprises a setting configured to guarantee the real-time processing for a minimum clock and supply voltage.

In Example 10, the subject matter of any one of Examples 6-9 can optionally include storing a current clock and voltage setting before applying the obtained clock and voltage setting to the baseband processing.

In Example 11, the subject matter of any one of Examples 1-10 can optionally include adjusting the at least one of the clock rate and supply voltage of the baseband processing based on dynamical voltage and frequency scaling (DVFS).

In Example 12, the subject matter of any one of Examples 1-11 can optionally include demodulating and decoding the granted data resource blocks as indicated by the DL grant information within a first section of the TTI.

In Example 13, the subject matter of Example 12 can optionally include turning off the demodulating and decoding for the remaining section of the TTI after having demodulated and decoded the granted data resource blocks.

In Example 14, the subject matter of any one of Examples 1-13 can optionally include that the supply voltage of the baseband processing comprises a DC supply voltage.

In Example 15, the subject matter of any one of Examples 1-14 can optionally include that the DL grant information is detected from a PDCCH channel of the DL BB signal, and that the number of granted data resource blocks indicate granted resource blocks in a PDSCH channel of the DL BB signal.

Example 16 is a baseband processor comprising: a baseband front end component configured to receive a downlink (DL) baseband (BB) signal in a transmission time interval (TTI), wherein the DL BB signal comprises a time-frequency resource comprising a control section and a data section; a demodulation chain configured to decode at least part of the control section; and a controller configured to detect a DL grant information from the decoded control section and if the DL grant information is detected: to determine a number of granted data resource blocks from the DL grant information and to adjust at least one of a clock rate and supply voltage of the baseband processor based on the number of granted resource blocks.

In Example 17, the subject matter of Example 16 can optionally include that the demodulation chain is configured to decode the at least part of the control section in an initial part of the TTI.

In Example 18, the subject matter of Example 17 can optionally include that the initial part of the TTI comprises one of a first, second or third OFDM symbol of the DL BB signal.

In Example 19, the subject matter of any one of Examples 16-18 can optionally include that the controller is configured to reduce the at least one of the clock rate and supply voltage of the baseband processor if the number of granted data resource blocks is smaller than a pre-defined threshold.

In Example 20, the subject matter of Example 19 can optionally include that the controller is configured to stepwise reduce the at least one of the clock rate and supply voltage of the baseband processor based on a set of pre-defined clock rates and supply voltages.

In Example 21, the subject matter of any one of Examples 16-20 can optionally include a lookup table configured to store a clock and voltage setting for the baseband processor, and that the controller is configured to obtain the clock and voltage setting for the baseband processor from the lookup table and to apply the retrieved clock and voltage setting to the baseband processor.

In Example 22, the subject matter of Example 21 can optionally include that the lookup table is configured to store pre-defined clock and voltage settings based on pre-defined numbers of granted data resource blocks.

In Example 23, the subject matter of Example 22 can optionally include that a pre-defined clock and voltage setting for a pre-defined number of granted data resource blocks comprises a setting configured to guarantee to meet real-time processing of the number of granted data resource blocks within the TTI.

In Example 24, the subject matter of Example 23 can optionally include that the pre-defined clock and voltage setting comprises a setting configured to guarantee the real-time processing for a minimum clock and supply voltage.

In Example 25, the subject matter of any one of Examples 21-24 can optionally include a memory configured to store a current clock and voltage setting before applying the retrieved clock and voltage setting to the baseband processor.

In Example 26, the subject matter of any one of Examples 16-25 can optionally include that the controller is configured to adjust the at least one of the clock rate and supply voltage of the baseband processor based on dynamical voltage and frequency scaling (DVFS).

In Example 27, the subject matter of any one of Examples 16-26 can optionally include that the demodulation chain is configured to demodulate and decode the granted data resource blocks as indicated by the DL grant information within a first section of the TTI.

In Example 28, the subject matter of Example 27 can optionally include that the controller is configured to turn off the demodulation chain for the remaining section of the TTI after having demodulated and decoded the granted data resource blocks.

In Example 29, the subject matter of any one of Examples 16-28 can optionally include that the supply voltage of the baseband processor comprises a DC supply voltage.

In Example 30, the subject matter of any one of Examples 16-29 can optionally include that the controller is configured to detect the DL grant information from a PDCCH channel of the DL BB signal; and that the number of granted data resource blocks indicate granted resource blocks in a PDSCH channel of the DL BB signal.

In Example 31, the subject matter of any one of Examples 16-30 can optionally include that the baseband front end component comprises a buffer configured to temporarily buffer the downlink (DL) baseband (BB) signal during a setup time when the at least one of the clock rate and supply voltage of the baseband processor is adjusted.

In Example 32, the subject matter of any one of Examples 16-31 can optionally include that the demodulation chain comprises: an inner receiver configured to demodulate the DL BB signal; and an outer receiver configured to decode the demodulated DL BB signal.

In Example 33, the subject matter of any one of Examples 16-32 can optionally include that the demodulation chain is configured to process the DL BB signal in a current TTI before a new DL BB signal is received at the baseband front end component in a next TTI.

Example 34 is a processor, comprising: a receiver configured to receive a first component carrier signal and a second component carrier signal, wherein each component carrier signal comprises a time-frequency resource comprising a control section and a data section; a first decoder configured to decode at least part of the control section of the first component carrier signal; a second decoder configured to decode at least part of the control section of the second component carrier signal; and a controller configured to detect a first DL grant information from the decoded control section of the first component carrier signal and a second DL grant information from the decoded control section of the second component carrier signal, and if the first and second DL grant information are detected: to determine a first number of granted data resource blocks from the first DL grant information and a second number of granted data resource blocks from the second DL grant information and to adjust at least one of a clock rate and supply voltage of the processor based on the greater number of the first number and the second number of granted resource blocks.

In Example 35, the subject matter of Example 34 can optionally include that the first decoder is configured to decode the at least part of the control section of the first component carrier signal in an initial part of the TTI; and that the second decoder is configured to decode the at least part of the control section of the second component carrier signal in an initial part of the TTI.

In Example 36, the subject matter of Example 35 can optionally include that the initial part of the TTI comprises one of a first, second or third OFDM symbol of the first or second component carrier signal.

In Example 37, the subject matter of any one of Examples 34-36 can optionally include that the controller is configured to reduce the at least one of the clock rate and supply voltage of the processor if the greater one of the first number and the second number of granted resource blocks is smaller than a pre-defined threshold.

Example 38 is a processor, comprising: a receiver configured to receive a first component carrier signal and a second component carrier signal, wherein each component carrier signal comprises a time-frequency resource comprising a control section and a data section; a decoder configured to decode at least part of the control section of the first component carrier signal and configured to decode at least part of the control section of the second component carrier signal; and a controller configured to detect a first DL grant information from the decoded control section of the first component carrier signal and a second DL grant information from the decoded control section of the second component carrier signal, and if the first and second DL grant information are detected: to determine a first number of granted data resource blocks from the first DL grant information and a second number of granted data resource blocks from the second DL grant information and to adjust at least one of a clock rate and supply voltage of the processor based on a sum of the first number and the second number of granted resource blocks.

In Example 39, the subject matter of Example 38 can optionally include that the decoder is configured to sequentially decode the at least part of the control section of the first component carrier signal and the at least part of the control section of the second component carrier signal.

In Example 40, the subject matter of Example 39 can optionally include that the decoder is configured to decode the at least part of the control section of the first component carrier signal and the at least part of the control section of the second component carrier signal in an initial part of the TTI.

Example 41 is a baseband processing device, comprising: means for receiving a downlink (DL) baseband (BB) signal in a transmission time interval (TTI), wherein the DL BB signal comprises a time-frequency resource comprising a control section and a data section; means for decoding at least part of the control section to detect a DL grant information; means for determining a number of granted data resource blocks from the DL grant information if the DL grant information is detected; and means for adjusting at least one of a clock rate and supply voltage of the baseband processing based on the number of granted resource blocks.

In Example 42, the subject matter of Example 41 can optionally include means for decoding the at least part of the control section in an initial part of the TTI.

Example 43 is a baseband processing system comprising: a baseband front end subsystem configured to receive a downlink (DL) baseband (BB) signal in a transmission time interval (TTI), wherein the DL BB signal comprises a time-frequency resource comprising a control section and a data section; a demodulation subsystem configured to decode at least part of the control section; and a controlling subsystem configured to detect a DL grant information from the decoded control section and if the DL grant information is detected: to determine a number of granted data resource blocks from the DL grant information and to adjust at least one of a clock rate and supply voltage of the baseband processing system based on the number of granted resource blocks.

In Example 44, the subject matter of Example 43 can optionally include that the demodulation subsystem is configured to decode the at least part of the control section in an initial part of the TTI.

Example 45 is a computer readable non-transitory medium on which computer instructions are stored which when executed by a computer cause the computer to perform the baseband processing method of any one of Examples 1 to 15.

Example 46 is a user equipment (UE), comprising: a radio frequency processor configured to transceive radio signals; a baseband processor according to the subject matter of any one of Examples 16-33, wherein the baseband processor is configured to process the radio signals transceived by the radio frequency processor in a baseband depending on the clock rate; and a battery configured to supply at least the baseband processor with the supply voltage.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

What is claimed is:
1. A baseband processing method, comprising:
    receiving a downlink (DL) baseband (BB) signal in a transmission time interval (TTI), wherein the DL BB signal comprises a time-frequency resource comprising a control section;
    decoding at least part of the control section to detect a DL grant information;

if the DL grant information is detected, determining a positive number of granted data resource blocks from the DL grant information; and adjusting at least one of a clock rate and supply voltage associated with the baseband processing based on a comparison of the positive number of granted data resource blocks to a plurality of positive threshold of granted data resource blocks.

2. The baseband processing method of claim 1, comprising decoding the at least part of the control section in an initial part of the TTI.

3. The baseband processing method of claim 2, wherein the initial part of the TTI comprises one of a first, second or third OFDM symbol of the DL BB signal.

4. The baseband processing method of claim 1, comprising reducing the at least one of the clock rate and supply voltage of the baseband processing if the positive number of granted data resource blocks is smaller than a pre-defined threshold.

5. The baseband processing method of claim 4, wherein reducing the at least one of the clock rate and supply voltage of the baseband processing comprises a step-wise reduction based on a set of predefined clock rates.

6. The baseband processing method of claim 1, wherein adjusting the at least one of the clock rate and supply voltage comprises:
obtaining a clock and voltage setting for the baseband processing from a lookup table; and
applying the obtained clock and voltage setting to the baseband processing.

7. The baseband processing method of claim 6, wherein the lookup table stores pre-defined clock and voltage settings based on pre-defined positive numbers of granted data resource blocks.

8. The baseband processing method of claim 7, wherein a pre-defined clock and voltage setting for a pre-defined positive number of granted data resource blocks comprises a setting configured to guarantee to meet real-time processing of the positive number of granted data resource blocks within the TTI.

9. The baseband processing method of claim 8, wherein the pre-defined clock and voltage setting comprises a setting configured to guarantee the real-time processing for a minimum clock and supply voltage.

10. The baseband processing method of claim 6, comprising storing a current clock and voltage setting before applying the obtained clock and voltage setting to the baseband processing.

11. The baseband processing method of claim 1, comprising adjusting the at least one of the clock rate and supply voltage of the baseband processing based on dynamical voltage and frequency scaling (DVFS).

12. The baseband processing method of claim 1, comprising demodulating and decoding the granted data resource blocks as indicated by the DL grant information within a first section of the TTI.

13. The baseband processing method of claim 12, comprising turning off the demodulating and decoding for a remaining section of the TTI after having demodulated and decoded the granted data resource blocks.

14. The baseband processing method of claim 1, wherein the supply voltage of the baseband processing comprises a DC supply voltage.

15. The baseband processing method of claim 1, wherein the DL grant information is detected from a PDCCH channel of the DL BB signal, and wherein the positive number of granted data resource blocks indicate granted data resource blocks in a PDSCH channel of the DL BB signal.

16. A baseband processor comprising:
a baseband front end component configured to receive a downlink (DL) baseband (BB) signal in a transmission time interval (TTI), wherein the DL BB signal comprises a time-frequency resource comprising a control section;
a demodulation chain configured to decode at least part of the control section; and
a controller configured to detect a DL grant information from the decoded control section and if the DL grant information is detected, the controller configured to:
determine a positive number of granted data resource blocks from the DL grant information; and
adjust at least one of a clock rate and supply voltage of the baseband processor based on a comparison of the positive number of granted data resource blocks to a plurality of positive thresholds of granted data resource blocks.

17. The baseband processor of claim 16, wherein the demodulation chain is configured to decode the at least part of the control section in an initial part of the TTI.

18. The baseband processor of claim 17, wherein the initial part of the TTI comprises one of a first, second or third OFDM symbol of the DL BB signal.

19. The baseband processor of claim 16, wherein the controller is configured to reduce the at least one of the clock rate and supply voltage of the baseband processor if the positive number of granted data resource blocks is smaller than a pre-defined threshold.

20. The baseband processor of claim 19, wherein the controller is configured to step-wise reduce the at least one of the clock rate and supply voltage of the baseband processor based on a set of predefined clock rates and supply voltages.

21. The baseband processor of claim 16, comprising a lookup table configured to store a clock and voltage setting for the baseband processor, wherein the controller is configured to:
obtain the clock and voltage setting for the baseband processor from the lookup table; and
apply the obtained clock and voltage setting to the baseband processor.

22. The baseband processor of claim 21, wherein the lookup table is configured to store pre-defined clock and voltage settings based on pre-defined positive numbers of granted data resource blocks.

23. A user equipment (UE), comprising:
a radio frequency processor configured to transceive radio signals;
a baseband processor comprising:
a baseband front end component configured to receive a downlink (DL) baseband (BB) signal in a transmission time interval (TTI), wherein the DL BB signal comprises a time-frequency resource comprising a control section;
a demodulation chain configured to decode at least part of the control section; and
a controller configured to detect a DL grant information from the decoded control section and if the DL grant information is detected, the controller configured to:
determine a positive number of granted data resource blocks from the DL grant information; and
adjust at least one of a clock rate and supply voltage of the baseband processor based on a comparison of the positive number of granted data resource blocks to a plurality of positive thresholds of granted data resource blocks, wherein the baseband processor is configured to process the radio signals transceived by the radio frequency processor in a baseband depending on the clock rate; and a battery configured to supply at least the baseband processor with the supply voltage.

24. A processor, comprising:

a receiver configured to receive a first component carrier signal and a second component carrier signal, wherein each component carrier signal comprises a time-frequency resource comprising a control section;

a first signal processing hardware configured to decode at least part of the control section of the first component carrier signal;

a second signal processing hardware configured to decode at least part of the control section of the second component carrier signal;

a controller configured to detect a first DL grant information from the decoded control section of the first component carrier signal and a second DL grant information from the decoded control section of the second component carrier signal, and if the first and second DL grant information are detected, the controller configured to:

determine a first positive number of granted data resource blocks from the first DL grant information and a second positive number of granted data resource blocks from the second DL grant information; and adjust at least one of a clock rate and supply voltage of the processor based on a greater number of positive resource blocks between the first positive number of granted data resource blocks and the second positive number of granted data resource blocks and a comparison of the greater number of positive resource blocks to a plurality of positive thresholds of granted resource blocks.

25. The processor of claim 24, wherein the first signal processing hardware is configured to decode the at least part of the control section of the first component carrier signal in an initial part of the TTI; and wherein the second signal processing hardware is configured to decode the at least part of the control section of the second component carrier signal in an initial part of the TTI.

* * * * *